United States Patent
Westmijze et al.

(10) Patent No.: US 8,367,784 B2
(45) Date of Patent: Feb. 5, 2013

(54) CONTINUOUS DOSING OF EXTREMELY FAST INITIATORS DURING POLYMERIZATION REACTIONS

(75) Inventors: Hans Westmijze, Bathman (NL); Andreas Petrus Van Swieten, Velp (NL); Lambertus Meulenbrugge, Westervoort (NL); Koen Antoon Kornelis Vanduffel, Deventer (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 12/911,598

(22) Filed: Oct. 25, 2010

(65) Prior Publication Data

US 2011/0046328 A1 Feb. 24, 2011

Related U.S. Application Data

(63) Continuation of application No. 10/498,542, filed as application No. PCT/EP02/14518 on Dec. 18, 2002, now abandoned.

(60) Provisional application No. 60/342,434, filed on Dec. 21, 2001.

(51) Int. Cl.
 *C08F 2/16* (2006.01)
(52) U.S. Cl. ............ 526/79; 524/81; 524/228; 524/227; 524/344.2
(58) Field of Classification Search ............ 526/79, 526/81, 228, 227, 344.2
 See application file for complete search history.

(56) References Cited

U.S. PATENT DOCUMENTS

| 4,125,695 | A | 11/1978 | Kamath |
| 6,384,155 | B1 | 5/2002 | Van Swieten et al. |
| 2005/0080207 | A1 | 4/2005 | Meulenbrugge et al. |

FOREIGN PATENT DOCUMENTS

| EP | 0 049 966 | 4/1982 |
| EP | 0 096 365 | 12/1983 |
| EP | 0 095 860 | 10/1986 |
| EP | 0 219 900 | 9/1990 |
| EP | 0 271 462 | 9/1990 |
| EP | 0 492 712 | 7/1992 |
| GB | 1 334 489 | 10/1973 |
| JP | 07-082304 | 3/1995 |
| WO | WO 00/17245 | * 3/2000 |

OTHER PUBLICATIONS

Barton et al., Radical polymerization in disperse systems, Ellis Horwood Limited (UK) and VEDA Publishing (Slovakia), 1994, pp. 302-304.
Nass, Leonard I. (Ed), Encyclopedia of PVC, vol. 1, Marcek Dekker, Inc. (NY), 1976, pp. 69-73 and 79, "Polyvinyl Chloride: Polymerization and Manufacture.".
Akzo Nobel Brochure, "Initiators for High Polymers," printed in 1998.
Brochure Peroxide-Chemie GmbH, Organic Peroxides; Polymerisation; Vinyl Chloride; Chapter 2,.
Manufacture of Plastics, vol. 1 (W. Mayo-Smith), 1964, p. 329.
Polymer Engineering and Science, vol. 31, pp. 313-320, 1991.
Encyclopedia of PVC, $2^{nd}$ Ed., vol. 1, pp. 77-82.
"Initiators for High Polymers," Akzo Nobel brochure with code 10737.
ISO 182-2; "pH Method," International Organization for Standardization Technical Committee ISO/TC 61, Plastics, 1990E.
"CPA. An Advanced Calorimeter System for Process Development and Safety Studies," Thermometric.
ChemiSens CPA, Application Notes 1 & 2, May 14, 1987.

* cited by examiner

*Primary Examiner* — Robert D. Harlan
(74) *Attorney, Agent, or Firm* — Timothy D. Meade

(57) ABSTRACT

The invention pertains to a process wherein initiators having a half-life from 0.0001 hour to 0.05 hour at the polymerization temperature are dosed to a polymerization mixture. The dosing of such initiator allows improved control of the polymerization rate and faster polymerization rates, and the process will render a polymer with very low residual initiator levels.

20 Claims, No Drawings

CONTINUOUS DOSING OF EXTREMELY FAST INITIATORS DURING POLYMERIZATION REACTIONS

CROSS-REFERENCE TO RELATED APPLICATION

This application is a continuation of U.S. patent application Ser. No. 10/498,542 filed on Nov. 9, 2004 now abandoned, which is U.S. National Phase of PCT/EP2002/14518 filed on Dec. 18, 2002, which claims priority to U.S. Provisional Application 60/342,434 filed on Dec. 21, 2001, all of which are incorporated herein by reference in their entirety.

The present invention relates to a process to polymerize or copolymerize vinyl chloride monomer wherein one or more organic initiators are dosed to the polymerization mixture at the reaction temperature during said polymerization.

Such a process is known from WO 00/17245, wherein initiators are dosed to a polymerization reactor at temperatures where the initiators have a half-life of from 0.05 to 1.0 hour. It is noted that the lower limit of this range (presenting the most reactive initiators) reflects the current opinion of the skilled person in the field that one cannot use a too reactive initiator for safety and efficiency reasons. More specifically, hitherto it has always been expected that initiators with a half-life of 0.05 hour or less at conventional polymerization temperatures (especially for initiators to be used at temperatures from 35° C. to 84° C.) could not be handled and transported safely because of the inherent instability of the products. Furthermore, these so-called "extremely fast initiators" were not expected to efficiently polymerize monomers, since they were expected to give all types of side-reactions, such as hydrolysis, carboxy-inversion (for instance, wherein a peroxyester is converted to the corresponding carbonate, or a diacylperoxide to the corresponding anhydride), and other types of (in-cage) rearrangement reactions, leading to an unacceptably low initiation efficiency. Indeed, an evaluation of the performance of extremely fast initiators in the more conventional processes, wherein all peroxide is dosed at once, showed they had a low efficiency.

The current invention relates to a new process wherein extremely fast initiators are dosed to a reactor during a polymerization reaction. Preferably, said polymerization is conducted at temperatures from 35° C. to 84° C. Preferably, the new process is a conventional process in which vinyl chloride monomer is polymerized and wherein extremely fast initiators are dosed during the polymerization. However, the new invention is also suitable for developing a continuous process for the polymerization of vinyl chloride. The process according to the invention gave unexpectedly high initiator efficiency and allowed even better control of the heat of polymerization being developed, allowing optimum reactor space-time yield, and even lower residual initiator levels in the resin after polymerization, compared to the process and products of WO 00/17245. Accordingly, a resin with even improved heat stability properties and low fish-eye levels was obtained, while the polymerization time could be shortened.

The new process is characterized in that extremely fast organic initiators are used in the polymerization process, which initiators have a half-life from 0.0001 hour to 0.050 hour at the polymerization temperature, more preferably from 0.001 to 0.050 hour, most preferably from 0.002 to 0.050 hour. It is noted that the term "to 0.050 hour" does not comprise the value 0.050. The dosing of such initiator allows improved control of the polymerization rate, higher polymerization rates, leading to an increased space-time yield of polymerization reactors, and results in the process rendering a polymer with very low residual initiator levels.

The process according to the invention is pre-eminently suited to polymerize monomer mixtures comprising vinyl chloride monomer (VCM). Preferably, the process according to the invention involves the polymerization of monomer mixtures comprising at least 50% by weight (% w/w) of VCM, based on the weight of all monomer. Comonomers that can be used are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes to a large extent determines the molecular weight of the resulting resin.

In the process according to the invention, one or more initiators may be used additionally, as long as at least one extremely fast initiator is dosed during part of the polymerization process. Preferably, all initiator used in the process has a half-life of at most 10% of the polymerization time at the polymerization temperature (or average polymerization temperature), so that the resin obtained by this process is essentially free of residual initiator. Preferably, the initiator is an organic peroxide. In another preferred embodiment, all initiator used in the polymerization process is extremely fast.

Preferred examples of processes according to the invention are processes wherein one or more of the following initiators are used:

Hexanoyl pivaloyl peroxide, with a half-life of less than 0.05 hr at temperatures greater than 38° C., 1,1,3,3-tetramethylbutylperoxy methoxy acetate, with a half-life of less than 0.05 hr at temperatures greater than 59° C., 2,2-bis(2,2-dimethylpropanoylperoxy)-4-methyl Pentane, with a half-life of less than 0.05 hr at temperatures greater than 61° C., diisobutanoyl peroxide, with a half-life of less than 0.05 hr at temperatures greater than 64° C., bis(tert-butylperoxy) oxalate, with a half-life of less than 0.05 hr at temperatures greater than 67° C., 2-(2,2-dimethylpropanoylperoxy)-2-(2-ethylhexanoylperoxy)-4-methyl pentane, with a half-life of less than 0.05 hr at temperatures greater than 69° C., α-cumyl peroxyneodecanoate (Trigonox® 99), with a half-life of less than 0.05 hr at temperatures greater than 81° C., 2,4,4-trimethylpentyl-2-peroxyneodecanoate, with a half-life of less than 0.05 hr at temperatures greater than 83° C., while they are dosed to a polymerization reaction mixture at or above the mentioned temperature at which the half-life is 0.05° C., more preferably at a temperature from the mentioned temperature at which the half-life is 0.05° C. up to 84° C.

Other initiators can also be used. For screening purposes, the initiators can be classified on the basis of their half-lives as determined by conventional thermal decomposition studies in monochlorobenzene, as is well known in the art (see for instance the brochure "Initiators for high polymers" with code 10737, obtainable from Akzo Nobel), and in accordance with the principles set out above. However, the value which is decisive for the half-life of the initiator is as presented in said brochure or, if it is not, the half-life as measured in a well-mixed model system being equal to the polymerization recipe in which the initiator is to be used, but wherein the monomer is replaced by 1-chlorobutane.

If so desired, a conventional peroxide with a half-life of from 0.05 to 5 hours, preferably from 0.05 to 3 hours, more preferably from 0.05 to 2 hours, at the polymerization temperature can be used in conjunction with the extremely fast initiators according to the invention, but this is less preferred. If a conventional initiator is used, it is advantageous to select it such that at the end of the polymerization, the residual level is at an acceptably low level. Typically, this means that if a conventional initiator is used, it will preferably be introduced into the reaction mixture prior to or just after the heat-up step, when the conversion, or the degree of polymerization, is below 80, preferably below 50, more preferably below 30, even more preferably below 10, and most preferably below 2% of all monomer used in the process.

It is furthermore preferred that two steps are present in the process. In a first step with a duration of up to 60 minutes, preferably up to 45 minutes, and more preferably up to 35 minutes, and with a minimum duration of 1 minute, preferably of 5 minutes, more preferably of 10 minutes, from 10 to 60% w/w, preferably from 10 to 40% w/w, of all initiator is dosed, such that the desired cooling capacity, preferably the maximum one, more preferably the maximum cooling capacity that is acceptable from a safety point of view, is reached at the end of this dosing step. Then, in a second step, the remaining initiator is dosed (added over time) to control the polymerization in such a way that the desired cooling capacity, preferably the maximum one available, more preferably the maximum cooling capacity that is acceptable from a safety point of view, is matched. Preferably, at least part of said second step involves dosing of initiator when the monomer conversion is greater than 40% w/w, more preferably greater than 60% w/w.

In this process it can be preferred to use extremely fast initiators and/or one or more conventional initiators during the polymerization stage wherein the content of the reactor is heated up to the desired polymerization temperature, the so-called cold-start process, since such a use can increase the space-time yield of the reactors.

It can be beneficial to introduce up to 4% w/w, more preferably up to 2% w/w, most preferably up to 1% w/w, of all extremely fast initiator immediately after the formation of the reaction mixture, in order to start the polymerization process. This procedure is particularly preferred if a certain amount of polymerization inhibitor (a radical trapping species) is present in the reaction mixture. If such a radical scavenger is present, for instance because it is introduced with the monomer wherein it is typically used as a stabilizer, the initially dosed initiator will react with said scavenger, thus preventing a delayed start of the polymerization reaction.

The initiator can be a redox initiation system. In such a case the reducing agent, the oxidizing agent, or both can be dosed in accordance with the invention. For such redox systems, the half-life of the redox system is the half-life as measured when all components of the system are present. However, in view of the fact that redox systems typically contain heavy metals and/or undesired reducing agents, the initiators of the present invention preferably are not such redox initiation systems.

The amount of initiator to be used in a process according to the invention is within the range conventionally used in polymerization processes. Typically, from 0.01 to 2% w/w of initiator, preferably 0.01-1% w/w, more preferably 0.01-0.5% w/w, based on the weight of the monomer(s) to be polymerized, is used.

The initiator is dosed to the reactor in the pure form or, preferably, in the form of a dilute solution or dispersion (such as a suspension or emulsion). One or more suitable solvents can be used to dilute the initiator. Preferably, such solvents are easily removed during the steps in which the polymer is worked up after the polymerization process, as with alcohols, or they are of such a nature that it is acceptable to leave them as a residue in the final polymer, as is the case for solvents that are desired plasticizers for the final resin. Furthermore, it can be advantageous, but is not necessarily required, that such solvents do not adversely affect the thermal stability of the initiator dissolved therein, as can be verified by analyzing the half-life temperature of the initiator in said solvent. An example of such a solvent is isododecane. If an initiator dispersion is dosed, then it can be a dispersion of either the initiator itself or of a solution of the initiator, preferably in said suitable solvents. Preferably, the dispersion is an aqueous dispersion. Preferably, the initiator is dosed in a concentration of 0.1 to 60% w/w, more preferably 0.5 to 25% w/w, and most preferably 2 to 15% w/w. The more dilute initiator solutions or dispersions ensure rapid mixing of the initiator and the polymerization mixture, which leads to a more efficient use of the initiator, which is crucial for the extremely fast initiators that are used.

It is to be understood that the word "dosing" is used to describe the step of adding peroxide to the polymerizing reaction mixture at polymerization conditions. The dosing can be done intermittently during the polymerization over a period of time wherein preferably at least 20%, preferably at least 40%, more preferably at least 60%, of all monomer used in the process is polymerized, meaning that at least two portions of initiator are added to the reaction mixture, or it can be continuous, meaning that for a certain period of time the initiator is continuously added to the reaction mixture, or any combination of these techniques. Examples of a combination of such techniques include, for instance, a process wherein the initiator is first added continuously, then the addition is stopped, and then again it is added continuously. If an intermittent operation is selected, there are at least 2, preferably at least 4, more preferably at least 10, and most preferably at least 20 moments at the polymerization temperature at which the initiator is dosed.

Most preferably, the peroxide is dosed continuously and/or intermittently from the start of the polymerization reaction, preferably after at least 5%, more preferably at least 10%, even more preferably at least 20%, most preferably at least 30%, of the monomer(s) has already been polymerized and wherein during the dosing period at least 2, preferably at least 5, more preferably at least 10%, more preferably at least 20%, more preferably at least 30%, and most preferably at least 50%, of all monomer used in the process is polymerized.

Preferably, the dosing can be effected at any suitable entry point to the reactor. If water is added in the course of the polymerization process, for example to compensate for the shrinkage of the reactor content due to the polymerization reaction, it can be advantageous to use the line through which this water is dosed to also dose the initiator. It is noted that if the formation of the initiator is fast enough, one can dose the raw materials for said initiator into piping or hold-up vessels, from which the initiator is then fed into the polymerization mixture. Alternatively, but less desired, there is the process wherein the raw materials are added to the polymerization mixture. In all instances it can be beneficial to add stirring equipment and/or heat exchangers to the feed lines in order to optimize efficiency.

The polymerization process can be conducted as a mass process wherein the reaction mixture is predominantly monomer or as a suspension process wherein the reaction mixture typically is a suspension of monomer in water, or as an emulsion or micro-emulsion process wherein the monomer typically is emulsified in water. In these processes the usual additives will have to be used. For example, if the monomer is present in the form of a suspension in water, the usual additives like surfactant(s), protective colloid(s), anti-fouling agent(s), pH-buffer(s), etc. may be present. Depending on the type of polymer desired, each of the above-mentioned processes may be preferred. The process according to the invention is especially suited for mass and suspension processes.

Because the polymerization rate can be controlled very adequately, the polymerization process becomes safer. More specifically, when the dosing of the initiator is stopped, the polymerization process halts almost instantaneously. This means that where a conventional process rate is limited for safety reasons (peroxide is present and a too high concentration will lead to an uncontrollable to run-away reaction), the present process is not hampered by such safety restrictions. Hence with the present process much faster polymerization rates can be achieved because much higher peroxide loads can be applied. It is therefore that we claim, in a preferred embodiment, all conventional polymerization processes wherein extremely fast peroxides are dosed and wherein at least 80% of all monomer is polymerized within a period of 2 hours. Preferably, at least 85% of the monomer is polymerized within 2 hours. Most preferably, at least 85% of all monomer is polymerized within 110 minutes.

The fact that such very high polymerization rates can be achieved opens up the possibility to polymerize or copolymerize vinyl chloride in accordance with the present invention in a continuous fashion, or in a combination of batch and continuous fashions. The skilled person will have no difficulty in converting the above information, as presented for batch operations, into a (semi-)continuous operation mode. As an example, it is noted that in order to achieve a good control over the polymerization rate in a continuous tube-like reactor, it, is necessary to add the initiator at various addition points in the reactor, with the addition rate having to be chosen such that the polymerization rate is adequate until the next addition point. Hence, in such a case typically a multitude of controlling and addition points will be necessary.

After the polymerization, the resulting (co)polymer (or resin) will be worked up as is usual in the art. Polymers obtained by a suspension polymerization according to the invention, for example, will be submitted to the usual drying and screening steps. The resulting resin preferably is characterized in that it contains less than 50 ppm of residual initiator, more preferably less than 40 ppm, and most preferably less than 25 ppm of initiator, immediately after drying for 1 hour at 60° C. and screening. The resin was found to exhibit excellent heat stability as measured with a Metrastat® PSD260 testing oven according to method ISO 182-2 (1990E). The improved heat stability proved that the resin hardly discoloured when submitted to melt-processing steps, e.g., to form shaped articles.

EXPERIMENTAL

In a standard suspension polymerization experiment, a temperature controlled 1-liter stainless steel Büchi reactor provided with one baffle, two flat-bladed stirrers at three levels, a pressure transducer, a vinyl chloride (VCM) feed line, and a nitrogen purge line was charged with: 425 g of demineralized water, 5 g of a 5% solution of Alcotex® B72 (polyvinylacetate/alcohol) in demineralized water, and pressurized to 15 barg, using nitrogen. If no leaks are observed, the reactor is evacuated and pressurized with nitrogen up to 5 barg three times to flush out virtually all air. If not all initiator is dosed, then the desired amount of initiator is added. Next, the reactor was evacuated and charged with 250 g VCM ex Akzo Nobel Salt & Base, followed by heating up of the reactor to the polymerization temperature of 68° C. in 30-60 minutes. After a pressure drop in the reactor, or 4.5 hours of reaction time, whichever took shorter, the polymerization was continued for another half hour, and then the reactor was cooled to 20-25° C., evacuated, and freed of virtually all remaining VCM. The polymer was obtained after filtration, washing, and drying (at 60° C. for 1 hour using a fluidized bed).

The initiator(s) used, the amount dosed, the dosing procedure, and the polymerization results are presented in Table 1.

The heat formed during the polymerization process is measured and cooling adapted to the heat formed. The more heat is generated at a certain time, the more difficult it will be to control the temperature of the reaction mixture. A low heat peak together with high polymer yields is preferred, since then an optimum in the space-time yield of the reactor can be attained. However, since in a continuous process cooling is easier, especially such types of reactors would allow even higher peroxide concentrations.

Example 1

After reaching the polymerization temperature, 500 ppm of pure diisobutanoyl peroxide (calculated on VCM), used as Trigonox® 187 at a concentration of 1% in isododecane, was dosed to the reaction mixture over a period of 30 minutes. Thereafter the dosing speed was reduced to roughly 300 ppm of diisobutanoyl peroxide per hour (using the same solution) over a period of 2.5 hrs in such a way that the cooling capacity necessary to keep the reaction mixture at the polymerization temperature was kept constant. A pressure drop was observed. The results are mentioned in Table 1

Comparative Example A

After reaching the polymerization temperature, 1,250 ppm of pure diisobutanoyl peroxide (calculated on VCM), supplied as Trigonox® 187 in a 30% solution in isododecane, was added within two minutes.

After 5 hours of reaction time the polymerization was stopped and worked up as described in the experimental procedure. The yield is mentioned in Table 1.

TABLE 1

Expected results of VCM suspension polymerization with Trigonox ® 187 at 68° C. according to procedures for continuous dosing and for warm start.

|  | Example 1 Continuous dosing 500 ppm added during 30 minutes and subsequently 300 ppm/hr during 2.5 hrs | Comparison Warm start Peroxide added in 2 minutes at polymerization time |
|---|---|---|
| Peroxide quantity used | 1,250 ppm | 1,250 ppm |
| Constant pressure time | 2.5 hrs | No pressure drop |
| Polymerization time | 3 hrs | 5 hrs |
| PVC yield | 85% | 25% |

Examples 2 and 3

Example 2 was carried out according to the same procedure as Example 1, but the temperature was increased to 82° C. and the peroxide concentration and dosing were slightly altered, as can be seen in Table 2. The Trigonox® 187 was dosed as an aqueous emulsion with a concentration of 1% ww.

In Example 3 VCM was polymerized in a 10-liter reactor at 68° C., instead of using the 1-l scale. The starting ratio of VCM/water was 1/1.4. The initiator was dosed as an emulsion with a concentration of 1%

TABLE 2

The results of VCM suspension polymerization with Tx 187 according to the procedure for continuous dosing

|  | Example 2 | Example 3 |
|---|---|---|
| Polymerization temperature | 82° C. | 68° C. |
| T (½) initiator | 0.006 hr | 0.03 hr |
| Scale | 1 Litre | 10 Litres |
| PVA | 1,000 ppm Alcotex B72<br>500 pp Alcotex B78 | 415 pp Alcotex B72<br>100 ppm GH 23 (ex Gohsenol)<br>50 ppm Alcotex 552P |
| Peroxide quantity used | 1,185 ppm Trigonox 187 on VCM | 1,660 ppm Trigonox 187 on VCM |
| Dosing procedure | 200 ppm peroxide added during 12 minutes and subsequently 985 ppm during 220 minutes | 960 ppm peroxide added during 12 minutes and subsequently 700 ppm peroxide during 50 minutes |
| Polymerization rate | 30%/hr | 90%/hr |
| Constant pressure time | 147 min | 50 min |
| Pressure drop rate | 9 bar/hr | 22 bar/hr |
| Polymerization time | 3 hrs | 1.2 hrs |
| PVC yield | 84% | 91% |

The resulting PVC contained less than 25 ppm of residual peroxide after drying.

The invention claimed is:

1. Process to polymerize at a polymerization temperature a polymerizing reaction mixture comprising vinyl chloride monomer and optional further monomers using one or more initiators including at least one organic initiator with a half-life of from 0.0001 hour to 0.030 hour at the polymerization temperature, with at least part of said initiators being dosed to the polymerizing reaction mixture, the process comprising dosing the at least one organic initiator with a half-life of from 0.0001 hour to 0.030 hour at the polymerization temperature to the polymerizing reaction mixture at said polymerization temperature, the polymerization temperature being above the temperature at which the half-life of the at least one organic initiator is 0.030 hour, wherein the one or more initiators does not comprise 2,2-bis(2,2-dimethylpropanoylperoxy)-4-methyl pentane or 2-(2,2-dimethylpropanoylperoxy)-2-(2-ethylhexanoylperoxy)-4-methyl pentane.

2. A process according to claim 1 wherein at least part of the one or more initiators is dosed after at least 40% w/w of all monomer has been polymerized.

3. A process according to claim 1 wherein at least part of the one or more initiators is dosed, intermittently and/or continuously, during a period wherein at least 20% of all monomer used in the polymerization is polymerized.

4. A process according to claim 1 wherein at least part of the one or more initiators is dosed, intermittently and/or continuously, and wherein during the dosing period at least 2% of all monomer used in the process is polymerized.

5. A process according to claim 1 wherein essentially all of the one or more initiators is selected from the group consisting of organic peroxides.

6. The process of claim 5 wherein essentially all of the one or more initiators has a half-life of from 0.0001 hour to 0.03 hour at the polymerization temperature.

7. The process according to claim 1, wherein at least part of the one or more initiators is dosed after at least 60% w/w of all monomer has been polymerized.

8. The process according to claim 1, wherein the one or more initiators is dosed continuously.

9. The process according to claim 1, wherein the dosing comprises a first step having a duration of from 1 minute to 60 minutes during from which about 10% to about 60% of the one or more initiators is dosed to the polymerizing reaction mixture, and a second step after completion of the first step during which a remainder of the one or more initiators is dosed to the polymerizing reaction mixture.

10. The process according to claim 9, wherein at the end of the first step, a desired cooling capacity of a reactor in which the process to polymerize occurs is reached, and wherein the desired cooling capacity is matched during the second step.

11. The process according to claim 10, wherein the desired cooling capacity of the reactor is a maximum cooling capacity of the reactor.

12. The process according to claim 10, wherein a temperature of the polymerizing reaction mixture is held constant when the desired cooling capacity is reached.

13. A process according to claim 2 wherein essentially all of the one or more initiators is selected from the group consisting of organic peroxides.

14. The process of claim 13 wherein essentially all of the one or more initiators has a half-life of from 0.0001 hour to 0.03 hour at the polymerization temperature.

15. A process according to claim 3 wherein essentially all of the one or more initiators is selected from the group consisting of organic peroxides.

16. The process of claim 15 wherein essentially all of the one or more initiators has a half-life of from 0.0001 hour to 0.03 hour at the polymerization temperature.

17. A process according to claim 4 wherein essentially all of the one or more initiators is selected from the group consisting of organic peroxides.

18. The process of claim 17 wherein essentially all of the one or more initiators has a half-life of from 0.0001 hour to 0.03 hour at the polymerization temperature.

19. Vinyl chloride based (co)polymer obtainable by the process of claim 1, having less than 50 parts by weight of residual initiator, based on one million parts by weight of the (co)polymer, when measured immediately after polymerization and drying of the (co)polymer for 1 hour at 60° C.

20. A method of shaping a vinyl chloride (co)polymer, comprising the co(polymer) of claim 19 to above its melting temperature.

* * * * *